(12) United States Patent
Umemoto et al.

(10) Patent No.: US 7,872,714 B2
(45) Date of Patent: Jan. 18, 2011

(54) LIQUID CRYSTAL CELL SUBSTRATE WITH COLOR FILTER, LIQUID CRYSTAL CELL AND LIQUID CRYSTAL DISPLAY

(75) Inventors: Seiji Umemoto, Ibaraki (JP); Kentarou Takeda, Ibaraki (JP); Minoru Miyatake, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 173 days.

(21) Appl. No.: 12/278,418

(22) PCT Filed: Feb. 1, 2007

(86) PCT No.: PCT/JP2007/051676

§ 371 (c)(1),
(2), (4) Date: Oct. 24, 2008

(87) PCT Pub. No.: WO2007/091477

PCT Pub. Date: Aug. 16, 2007

(65) Prior Publication Data

US 2009/0096966 A1    Apr. 16, 2009

(30) Foreign Application Priority Data

Feb. 8, 2006   (JP) .............................. 2006-030561

(51) Int. Cl.
*G02F 1/1335* (2006.01)
(52) U.S. Cl. ..................................... 349/117
(58) Field of Classification Search ............... None
See application file for complete search history.

(56) References Cited

U.S. PATENT DOCUMENTS

| | | | |
|---|---|---|---|
| 6,081,312 A | 6/2000 | Aminaka et al. | |
| 2005/0142464 A1 | 6/2005 | Moriya | |
| 2009/0268133 A1* | 10/2009 | Yoshimi et al. | 349/107 |

FOREIGN PATENT DOCUMENTS

| | | |
|---|---|---|
| EP | 1026193 A1 | 8/2000 |
| JP | 10-312166 A | 11/1998 |
| JP | 2000-136253 A | 5/2000 |
| JP | 2001-242460 A | 9/2001 |
| JP | 2001-281647 A | 10/2001 |
| JP | 2001-290149 A | 10/2001 |
| JP | 2005-24919 A | 1/2005 |
| WO | 2004/017132 A1 | 2/2004 |
| WO | 2004/068225 A1 | 8/2004 |
| WO | 2007/089040 A1 | 8/2007 |

OTHER PUBLICATIONS

European Search Report dated Oct. 5, 2009, issued in corresponding European Patent Application No. 07707862.4.
Chinese Office Action dated Sep. 18, 2009, issued in corresponding Chinese Patent Application No. 2007800049393.
International Search Report of PCT/JP2007/051676, date of mailing Mar. 13, 2007.
Official Communication pursuant to Article 94(3) EPC dated Jul. 27, 2010, issued in corresponding European Patent Application No. 07707862.
Montbach Erica N et al.; "Control of dispersion in form birefringent-based holographic optical retarders", Optical Engineering, SOC. of Photo-Optical Instrumentation Engineers, Bellingham, vol. 44, No. 12, Dec. 1, 2005, pp. 124001-1 thru 124001-6.
Japanese Office Action dated Aug. 13, 2010, issued in corresponding Japanese Patent Application No. 2006-030561.

* cited by examiner

*Primary Examiner*—Sung H Pak
(74) *Attorney, Agent, or Firm*—Westerman, Hattori, Daniels & Adrian, LLP (57) ABSTRACT

The present invention provides a liquid crystal cell with a color filter having a transparent substrate and a color filter, where the retardation value Rth(B), Rth(G) and Rth(R) in the thickness direction, which is represented by the following formula (1) in the blue region, the green region and the red region of the color filter, satisfy the following formula (2) or (3):

$Rth = [\{(nx+ny)/2\} - nz] \times d$   Formula (1)

$Rth(B) > Rth(G) > Rth(R)$   Formula (2)

$Rth(B) < Rth(G) < Rth(R)$   Formula (3)

In the liquid crystal cell with a color filter according to the present invention, change in color due to leaking of light in a state of black display can be prevented, and an excellent image can be displayed with a wide angle of visibility.

6 Claims, 6 Drawing Sheets

LIQUID CRYSTAL CELL SUBSTRATE WITH COLOR FILTER, LIQUID CRYSTAL CELL AND LIQUID CRYSTAL DISPLAY

FIELD OF THE INVENTION

The present invention relates to a liquid crystal cell substrate with a color filter which is used in a color liquid crystal display, a liquid crystal cell and a liquid crystal display.

DESCRIPTION OF THE RELATED ART

In recent years, liquid crystal displays have been widely used in monitors for laptop personal computers and televisions, and in particular, use of liquid crystal displays for large scale televisions has been spreading rapidly.

In liquid crystal displays, it is important for the contrast ratio to be high when viewed in a diagonal direction and for a change in the color to be small (the level of black display is high in a state of black display). In particular, it is an important object to improve the properties in terms of the angle of visibility in color liquid crystal displays which have been widely used in recent years.

Liquid crystal displays generally have a liquid crystal cell and polarizing plates which are arranged on the two sides of the liquid crystal cell in such a manner that the absorption axes are approximately vertical or approximately parallel. In this liquid crystal cell, a transparent substrate where electrode elements for driving a liquid crystal are regularly aligned in matrix and a transparent substrate which faces this are held at a constant interval via spacers. Furthermore, the interval between the above described pair of transparent substrates is filled in with a liquid crystal material. In addition, a color filter is formed on the side of the transparent substrate where the electrode elements are provided and which is viewed.

The liquid crystal cells which are filled in with the liquid crystal material have a birefringence. Therefore, in the case where the liquid crystal cell is viewed in a diagonal direction, the level of black display lowers due to leaking of light.

Therefore, in order to improve the properties in terms of the angle of visibility of conventional liquid crystal displays, an optical compensation layer (also referred to as compensation plate, retardation plate, angle of visibility expanding film and the like) is provided on the liquid crystal cell. However, the level of black display for a wide angle of visibility cannot be prevented from lowering simply by providing an optical compensation layer at the current state.

The means described in the following gazettes are known as methods for improving change in color in color liquid crystal displays.

Japanese Unexamined Patent Publication No. 2001-242460 (JP-A-2001-242460) discloses that the in-plane retardation Δnd in a blue region of the color filter is greater than that in the green region or in the red region in order to prevent whole region of the color filter from becoming yellow when viewed in a diagonal direction. As a result, the ratio of blue light leaking out is great so that yellow which is a complimentary color of blue is offset as a whole. According to the means of JP-A-2001-242460, however, the level of black display cannot be increased in a wide angle of visibility.

In addition, Japanese Unexamined Patent Publication No. 2002-122866 discloses a TN type liquid crystal display where a retardation layer having a birefringence is provided between the two substrates which is filled in with a liquid crystal layer. According to this means, however, a retardation layer must be provided for each color of the color filters.

[Patent Document 1]
Japanese Unexamined Patent Publication No. 2001-242460

[Patent Document 2]
Japanese Unexamined Patent Publication No. 2002-122866

SUMMARY OF THE INVENTION

An object of the present invention is to provide a liquid crystal cell substrate with a color filter with which a change in color due to leaking of light can be prevented in a state of black display when viewed in a diagonal direction so that an excellent image display can be implemented in a wide angle of visibility, a liquid crystal cell and a liquid crystal display.

The present invention provides a liquid crystal cell substrate with a color filter having a transparent substrate and a color filter having three color regions: blue, green and red, where a retardation value Rth in the thickness direction, which is represented by the following formula (1) in the blue region, the green region and the red region of the color filter, satisfies the following formula (2) or (3):

$$Rth=[\{(nx+ny)/2\}-nz]\times d \quad \text{Formula (1)}$$

$$Rth(B)>Rth(G)>Rth(R) \quad \text{Formula (2)}$$

$$Rth(B)<Rth(G)<Rth(R) \quad \text{Formula (3)}$$

wherein nx and ny represent the in-plane refractive indexes of each color region (provided that $nx \geq ny$), nz represents the refractive index in the thickness direction of each color region, and d represents the thickness of each color region, Rth(B) represents the retardation value in the thickness direction for a wavelength of 450 nm in the blue region, Rth(G) represents the retardation value in the thickness direction for a wavelength of 546 nm in the green region, and Rth(R) represents the retardation value in the thickness direction for a wavelength of 633 nm in the red region.

Furthermore, a preferred embodiment of the present invention provides the liquid crystal cell substrate with the above described color filter which satisfies the following formula (4):

$$|Rth(B)-Rth(G)| \geq |Rth(G)-Rth(R)| \quad \text{Formula (4)}$$

In addition, the present invention provides a liquid crystal cell having the above described liquid crystal cell substrate with a color filter and an optical compensation layer.

A preferred embodiment of the present invention provides a liquid crystal cell in which the above described optical compensation layer is either a compensation layer having a relationship of $nx \approx ny > nz$ or a compensation layer having a relationship of $nx > nz > ny$.

In the above description, nx represents the in-plane refractive index in the direction of the slow axis, ny represents the in-plane refractive index in the direction of the fast axis and nz represents the refractive index in the thickness direction.

Furthermore, a preferred embodiment of the present invention provides a VA (vertical alignment) type liquid crystal cell.

In addition, the present invention provides a liquid crystal display having the above described liquid crystal cell.

In the liquid crystal cell with a color filter according to the present invention, a change in color due to leaking of light in a state of black display when viewed in a diagonal direction can be prevented. Accordingly, a liquid crystal display where an excellent image display can be implemented in a wide angle of visibility can be provided by using the liquid crystal cell with a color filter according to the present invention.

DETAILED DESCRIPTION OF THE PREFERRED EMBODIMENTS

<Principle for Solving the Problems>

As for the liquid crystal mode of liquid crystal displays, there are VA type, IPS type, TN type, STN type, OCB type, and the like.

From among these, in VA type (vertical alignment type) liquid crystal displays, the liquid crystal material is approximately vertical to the substrate when no voltage is applied. Therefore, in VA type liquid crystal displays, the black display as viewed from the front (in the normal direction of the panel) has the same properties as a crossed nicols polarizing plate and a very high contrast can be achieved.

However, the VA type liquid crystal layer which is filled in with the liquid crystal material in approximately vertical state exhibits a birefringence of $nz>nx\approx ny$ (so-called positive C plate), and therefore, a retardation is caused in the direction of the thickness. Accordingly, in the case where the VA type liquid crystal display is viewed in a diagonal direction, light leaks and the level of black in the state of black display is lowered.

Here in the case where a graph is provided taking the wavelength (λ) along the lateral axis and the refractive index (n) along the longitudinal axis, the wavelength dispersion of the refractive index of a substance becomes a curved form where the inclination is greater on the shorter wavelength side (this is derived from the Cauchy's dispersion formula). The wavelength dispersion of the retardation of the substance usually follows this and the case where a graph is provided taking the wavelength (λ) along the lateral axis and the retardation value along the longitudinal axis, a curve is gained such that the absolute value of the inclination is greater on the shorter wavelength side. That is to say, the wavelength dispersion of the retardation value becomes a continuous curve for each wavelength (monotonously increases or monotonously decreases) and the absolute value of the inclination of this wavelength dispersion curve is greater on the shorter wavelength side and smaller on the longer wavelength side in the curve (hereinafter, this wavelength dispersion curve is sometimes referred to as "Cauchy's dispersion curve"). Here, the inclination indicates an inclination of the tangent line drawn against the wavelength dispersion curve.

In addition, the retardation in the thickness direction (hereinafter sometimes referred to as "Rth") is found from the formula (1): $Rth=[\{(nx+ny)/2\}-nz]\times d$. The wavelength dispersion of this Rth also becomes a Cauchy's dispersion curve. Here, nx and ny represent the in-plane refractive indexes ($nx\geq ny$), nz represents the refractive index in the thickness direction and d represents the thickness.

These are the matters concerning various types of substances with a birefringence not only for the optical materials in the VA type liquid crystal layer, but also in the liquid crystal layers in other modes and optical compensation layers.

The Rth of the VA type liquid crystal layer where the refractive index is $nz>nx\approx ny$ (so-called positive C plate) is minus and the wavelength dispersion becomes a positive dispersion. Meanwhile, the Rth of the so-called negative C plate where the refractive index is $nz<nx\approx ny$ is plus and the wavelength dispersion becomes a positive dispersion.

Here, the positive dispersion means a dispersion which exhibits a wavelength dispersion curve where the absolute value of Rth (|Rth|) is greater on the shorter wavelength side. The reverse dispersion means a dispersion which exhibits a wavelength dispersion curve where the absolute value of Rth is smaller on the shorter wavelength side.

In addition, according to a simple method for preventing light from leaking from the above described VA type liquid crystal display, an optical compensation layer of which the Rth has a polar opposite of the VA type liquid crystal layer (that is to say Rth is plus) and of which the absolute value of Rth for each wavelength is approximately equal to the VA type liquid crystal layer is provided so that the Rth of the VA type liquid crystal layer is cancelled. A so-called negative C plate having $nz<nx\approx ny$ can be cited as such as the optical compensation layer.

However, even in the case where the above described optical compensation layer is provided to a VA type liquid crystal cell with a color filter, the level of black display lowers when viewed diagonally. Present inventors diligently conducted research regarding this point to find that the Rth of the VA type liquid crystal cell with a color filter is affected by the Rth in each color region of the color filter. The present inventors found that light cannot be prevented from leaking without taking this effect into consideration and by simply by providing an optical compensation layer which cancels the Rth of a liquid crystal cell as described above.

Specifically, a color filter is formed through application of a blue region through which blue light transmits, a green region through which green light transmits and a red region through which red light transmits. Each color region shows optical characteristics independently, and thus different Rth can be caused in each the color regions.

Light from the liquid crystal layer passes through the color filter and emits in terms of the liquid crystal cell with a color filter (hereinafter sometimes abbreviated to "liquid crystal cell"). Therefore, the Rth of the liquid crystal cell is the synthesis of the Rth of the liquid crystal layer and the Rth of the color filter.

Accordingly, the wavelength dispersion of the Rth of the VA type liquid crystal cell forms a curve which is synthesized by adding the Rth of the center wavelength (wavelength where the transmittance of each color becomes maximum) in each color region to the wavelength dispersion of the Rth of the VA type liquid crystal layer.

In general, the center wavelength of the blue region is 450 nm, the center wavelength of the green region is 546 nm and the center wavelength of the red region is 633 nm. Hereinafter, the Rth of the wavelengths of 450 nm in the blue region is denoted as Rth(B), the Rth of the wavelengths of 546 nm in the green region is denoted as Rth(G), and the Rth of the wavelengths of 633 nm in the red region is denoted as Rth(R).

A case where the Rth(B) is minus, the Rth(G) is plus and the Rth(R) is minus is cited as an example. In this case, shown in FIG. 1, the wavelength dispersion of the Rth of the VA type liquid crystal cell formed of the synthesis of the Rth in each color region and the Rth of the VA type liquid crystal layer monotonously increases toward the longer wavelength side for the wavelengths in a range from the blue region to the green region (monotonously shifts to the plus side) and monotonously decreases toward the longer wavelength side for the wavelengths in a range from the green region to the red region (monotonously shifts to the minus side).

Figure 1:
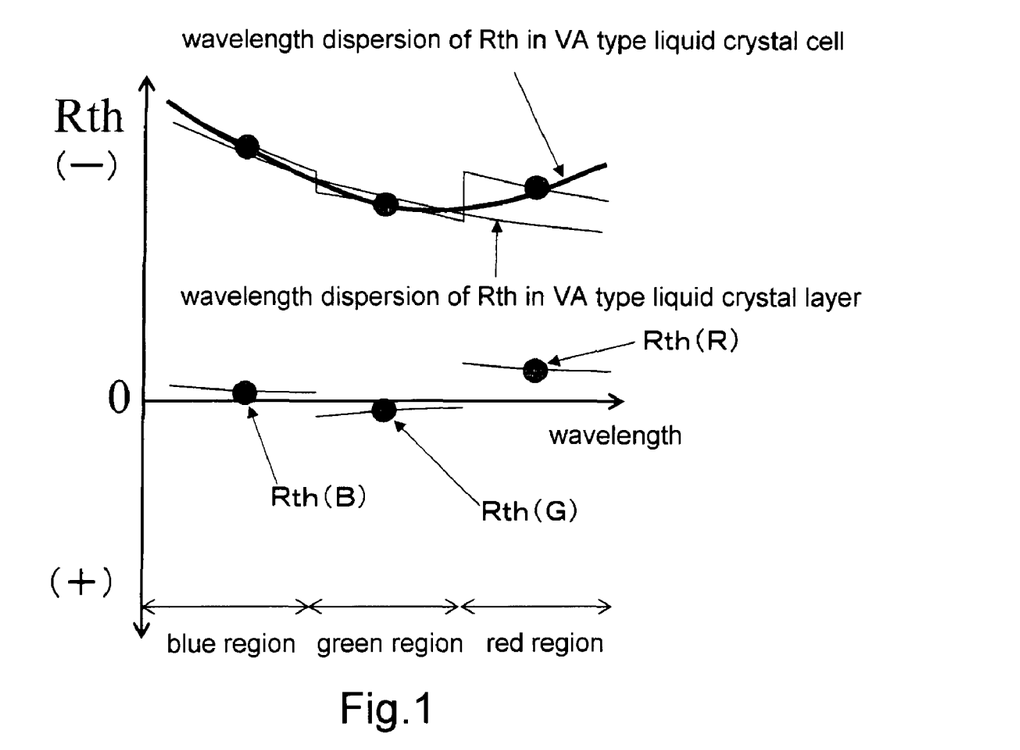
FIG. 1 is a reference graph showing wavelength dispersion in a conventional liquid crystal cell with a color filter.

A general purpose optical compensation layer cannot compensate for the liquid crystal cell which exhibits a wavelength dispersion curve having an inflexion point where the inclination inverses as described above.

That is to say, an object to be compensated can be compensated by providing an optical compensation layer of which the Rth is the polar opposite of the object to be compensated and of which the absolute value of Rth in each wavelength is approximately the same. Accordingly, in the case where the liquid crystal cell having an inflexion point as described above is compensated, an optical compensation layer exhibiting a wavelength dispersion curve having an inflexion point must be provided.

However, it can be seen from the above described Cauchy's dispersion formula that the absolute value of the inclination of the wavelength dispersion of the Rth of a general purpose optical compensation layer is greater on the shorter wavelength side. Accordingly, it is realistically difficult to compensate for the object using an optical compensation layer having an inflexion point at which the inclination of the wavelength dispersion curve of the Rth inverses.

In addition, in the case where an optical compensation layer which cancels the wavelength dispersion in a range from the blue region to the green region (negative C plate), for example, is used for the liquid crystal cell exhibiting a wavelength dispersion curve having an inflexion point, the red region cannot be compensated for and the tone becomes reddish in a state of black display. Likewise, in the case where a general purpose optical compensation layer which cancels the wavelength dispersion in a range from the green region to the red region is used, the blue region cannot be compensated for.

As described above, in the case where a conventional VA type liquid crystal cell is designed, the Rth of the color filter is not taken into consideration. Therefore, the liquid crystal cell cannot be compensated for by using a general purpose optical compensation layer (for example, negative C plate, or the like), and the level of black display in the liquid crystal display cannot be prevented from lowering.

The knowledge gained by focusing on the relationship between the Rth of the color filter and the Rth of the liquid crystal layer was discovered for the first time by the present inventors.

<Configuration of Color Filter According to the Present Invention>

Therefore, the present invention provides a liquid crystal cell substrate with a color filter having a transparent substrate and a color filter having three color regions: blue, green and red, which is formed in such a manner that the Rth of the blue region, the green region and the red region of the color filter satisfies the following formula (2) or (3).

$$Rth(B) > Rth(G) > Rth(R) \quad \text{Formula (2)}$$

$$Rth(B) < Rth(G) < Rth(R) \quad \text{Formula (3)}$$

The above described nx and ny represent the in-plane refractive index of each color region (provided that $nx \geq ny$), nz represents the refractive index in the thickness direction of each color region, and d represents the thickness of each color region. Rth(B) represents a retardation value in the thickness direction for a wavelength of 450 nm in the blue region, Rth(G) represents a retardation value in the thickness direction a wavelength of 546 nm in the green region, and Rth(R) represents a retardation value in the thickness direction for a wavelength of 633 nm in the red region.

The Rth in each color region of the color filter satisfies either Rth(B)>Rth(G)>Rth(R) or Rth(B)<Rth(G)<Rth(R), and therefore, the wavelength dispersion of Rth in the liquid crystal cell with a color filter is a continuous curve in each wavelength (monotonously increases or monotonously decreases) and a curve where the absolute value of the inclination of the curve is higher on the shorter wavelength side.

Accordingly, the liquid crystal cell can be compensated for using a general purpose optical compensation layer following the above described Cauchy's dispersion curve. As a result, light can be prevented from leaking in a state of black display on the liquid crystal display, and a liquid crystal display with a high level of black display as viewed from a diagonal angle can be provided.

Here, a wavelength of 450 nm, a wavelength of 546 nm and a wavelength of 633 nm are used as references, from among wavelengths in the blue region, the green region and the red region, because each color of light in each color region is the center wavelength having the highest transmittance. When, the Rth(B), Rth(G) and Rth(R) in these colors are used as references, color regions which satisfy the above relationship can be gained relatively easily.

In color filters which satisfy the above described formula (2): Rth(B)>Rth(G)>Rth(R), Rth(B), Rth(G) and Rth(R) are all minus (same symbols), as shown in FIG. 2, Rth(B), Rth(G) and Rth(R) are all plus (same symbols), as shown in FIG. 3, or Rth(B) and Rth(G) are plus and Rth(R) is minus (this last one is not shown).

Figure 2:
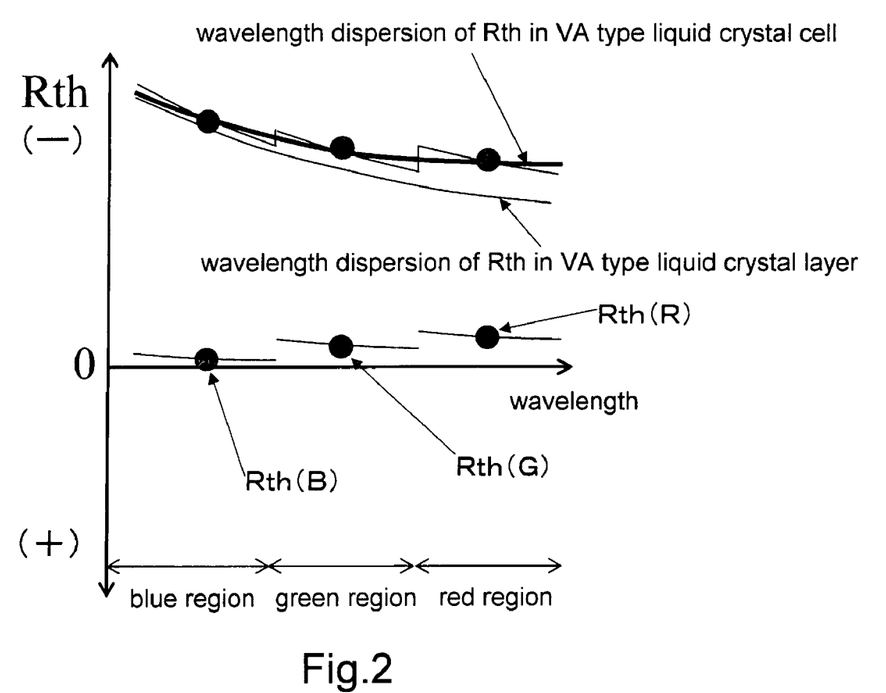
FIG. 2 is a reference graph showing wavelength dispersion in the liquid crystal cell with a color filter according to the present invention.
Figure 3:
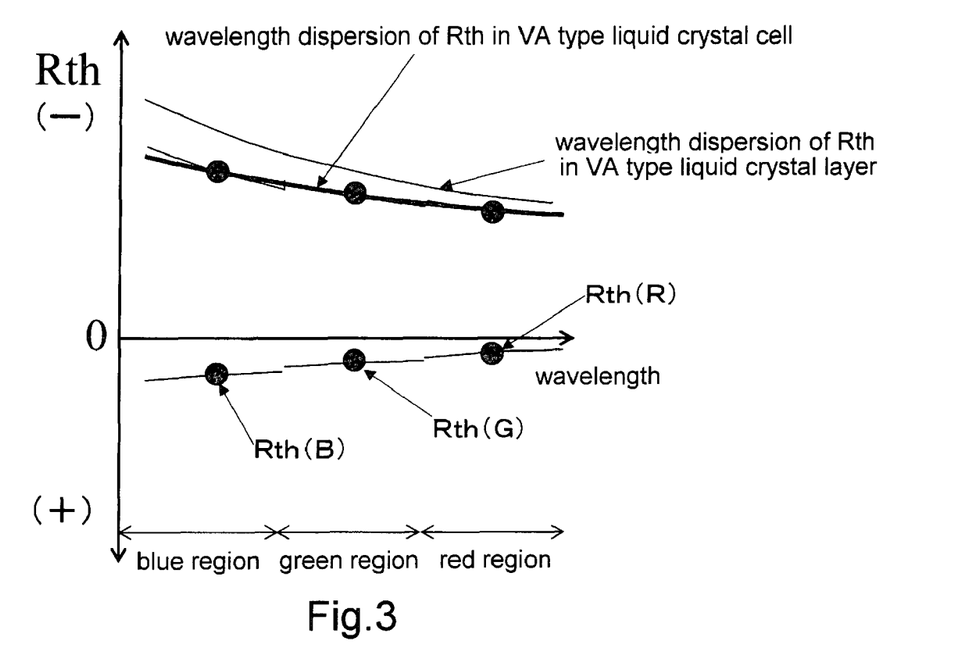
FIG. 3 is a reference graph showing wavelength dispersion in the liquid crystal cell with a color filter according to the present invention.

The wavelength dispersion of Rth in the VA type liquid crystal cell with a color filter, which is synthesized from the Rth of a color filter that satisfies formula (2) and the Rth of the VA type liquid crystal layer, becomes a Cauchy's dispersion curve, as shown in FIGS. 2 and 3.

Meanwhile, in color filters which satisfy the above described formula (3): Rth(B)<Rth(G)<Rth(R), Rth(B), Rth (G) and Rth(R) are all minus (same symbols), as shown in FIG. 4, Rth(B), Rth(G) and Rth(R) are all plus (same symbols), as shown in FIG. 5, or Rth(B) and Rth(G) are minus and Rth(R) is plus (this last one is not shown).

Figure 4:
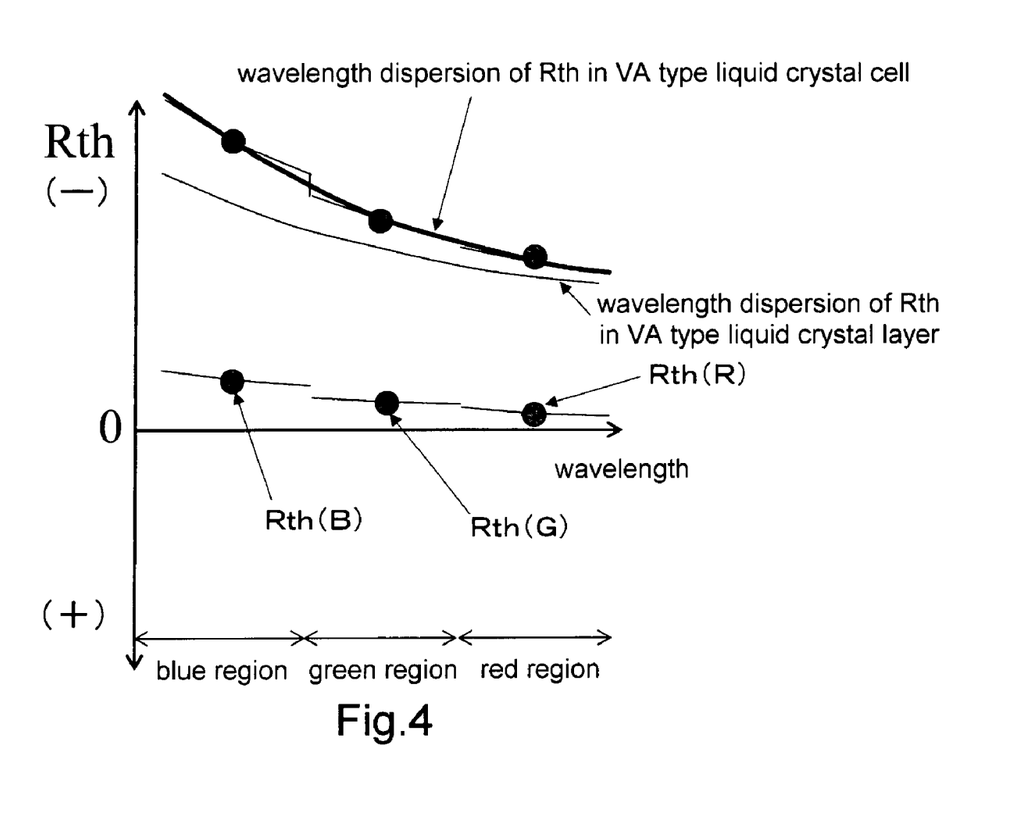
FIG. 4 is a reference graph showing wavelength dispersion in the liquid crystal cell with a color filter according to the present invention.
Figure 5:
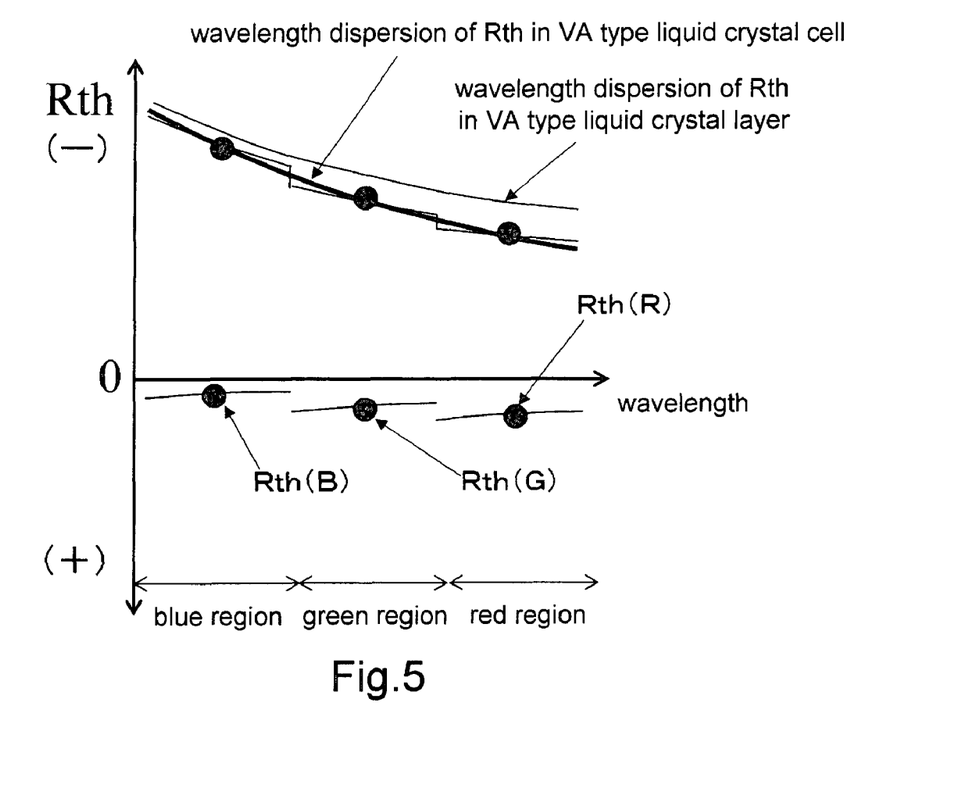
FIG. 5 is a reference graph showing wavelength dispersion in the liquid crystal cell with a color filter according to the present invention.

The wavelength dispersion of the Rth in the VA type liquid crystal cell with a color filter, which is synthesized from the Rth of a color filter that satisfies formula (3) and the Rth of the VA type liquid crystal layer, also becomes a Cauchy's dispersion curve, as shown in FIGS. 4 and 5.

As described above, the Rth of VA type liquid crystal cells which satisfy formula (2) or formula (3) both become a Cauchy's dispersion curve, and therefore, the VA type liquid crystal cell can be compensated for using a general purpose optical compensation layer (for example a negative C plate).

It is more preferable to use a color filter that further satisfies formula (4): $|Rth(B)-Rth(G)| \geq |Rth(G)-Rth(R)|$, from among color filters that satisfy the above described formula (2) or formula (3).

The smaller the absolute value of Rth(G)−Rth(R) is relative to the absolute value of Rth(B)−Rth(G), the smaller the change in the synthesized Rth of the VA type liquid crystal cell becomes on the longer wavelength side. Accordingly, the wavelength dispersion of synthesized Rth in the VA type liquid crystal cell becomes closer to a curve where the absolute value of the inclination is smaller on the longer wavelength side, and therefore, it tends to become easier to fit the Cauchy's dispersion curve. Such a VA type liquid crystal cell can be preferably compensated for using a general purpose optical compensation layer.

The concrete numeric values for Rth(B), Rth(G) and Rth(R) of the color filter are not particularly limited under conditions where the above described formula (2) or formula (3) are satisfied. In the case where |Rth(B)−Rth(G)| or |Rth(G)−Rth(R)| is too great, however, the wavelength dispersion curve of the synthesized Rth of the VA type liquid crystal cell cannot fit the Cauchy's dispersion curve. Regarding this respect, it is desirable for an appropriate Rth(B), Rth(G) and Rth(R) to be selected taking the wavelength dispersion curve of the synthesized Rth in the VA type liquid crystal cell into consideration.

<Concerning Liquid Crystal Cell>

Figure 6A:
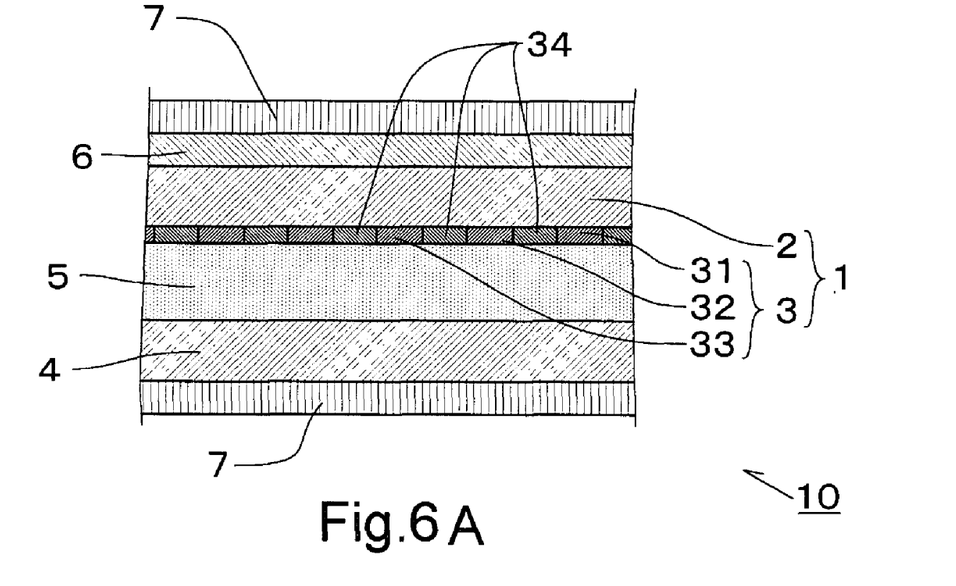
FIG. 6 is a reference cross sectional diagram showing the partially omitted liquid crystal cell according to the present invention.

Various conventional, well known structures can be adopted for the liquid crystal cell substrate with a color filter according to the present invention under such conditions that the Rth in the each color regions in the color filter have the same relationship as in the above described formula (2) or formula (3). For example, FIG. 6 shows an example of the configuration of the liquid crystal cell of the present invention.

The numeral 1 indicates a liquid crystal cell substrate with a color filter. The liquid crystal cell substrate 1 with a color filter has a transparent substrate 2 placed on the viewing (display) side, and a color filter 3 formed on the transparent substrate 2.

The numeral 10 indicates a liquid crystal cell. The liquid crystal cell 10 has the liquid crystal cell substrate 1 with a color filter, a second transparent substrate 4 place so as to face the substrate 1 with spacers in between (not shown), and a liquid crystal material with which the liquid crystal layer 5 formed between the transparent substrate 2 with a color filter and the second transparent substrate 4 is filled in. The liquid crystal cell 10 is assembled into a liquid crystal display for use.

The above described color filter 3 has a blue region 31, a green region 32 and a red region 33, which are formed in a predetermined pattern (stripe form or the like) on the transparent substrate 2. In addition, a black matrix 34 in a predetermined pattern is formed between the above described respective color regions 31, 32 and 33. Electrode elements (not shown), such as those on TFT substrates for driving the liquid crystal material, are provided on the liquid crystal layer 5 side of the color filter 3.

Figure 6B:
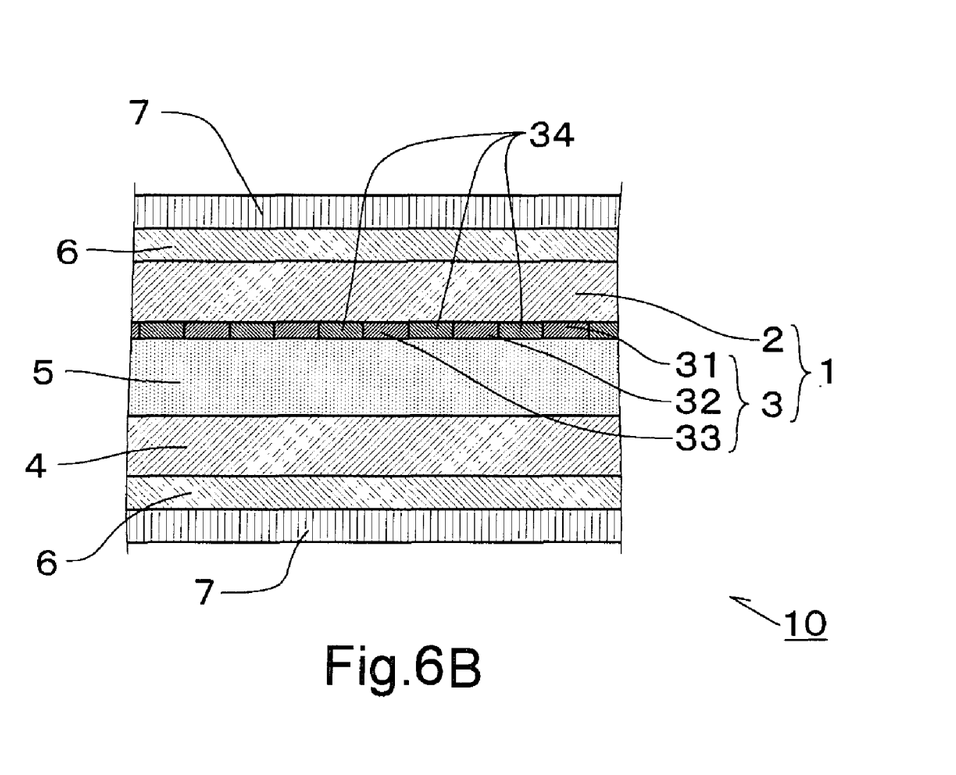

Furthermore, an optical compensation layer 6 is provided on the viewing side of the transparent substrate 1 with a color filter. Here, as shown in FIG. 6B, the optical compensation layer 6 can be provided on the second transparent substrate 4 side in such a manner as to sandwich the liquid crystal cell 10. The numeral 7 indicates a pair of polarizing plates provided on the two sides of the liquid crystal cell 10 (outside of the optical compensation layer 6). This pair of polarizing plates 7 and 7 is placed in such a manner that the absorption axes are approximately vertical or approximately parallel.

The above described transparent substrate 2 is not particularly limited, and transparent glass plates, such as of soda lime glass, low alkali borosilicate glass, non-alkali aluminoborosilicate glass; or transparent flexible materials, such as optical resin plates made of polycarbonate, polymethylmethacrylate or polyethylene terephthalate, which have flexibility, can be used.

The above described liquid crystal layer 5 can be filled in with any conventional, well-known liquid crystal material, but it is preferable to use a VA (vertical alignment) type liquid crystal material where the liquid crystal material is aligned approximately vertically to the transparent substrate when voltage is not applied, from the point of view of contrast. Rod form liquid crystal or the like can be used as the liquid crystal material.

The thickness of the dry film in the blue region 31, the green region 32 and the red region 33 is usually 0.2 μm to 10 μm, preferably approximately 0.2 μm to 5 μm. Here, as described below, the thickness of the layer may be different in each color region, in order to control the Rth in each color region.

<Material for Forming Color Filter and the Like>

Each color region of a color filter is formed by coating a coloring composition on a transparent substrate on the viewing side. The coloring composition has a transparent resin, a coloring matter carrier comprising a precursor thereof and a coloring matter, and preferably contains a photopolymerization initiator.

The transparent resin is a resin having a transmittance of preferably 80% or more, more preferably 95% or more in the whole wavelength range of 400 to 700 nm in the visible light range.

The transparent resin contains a thermoplastic resin, a thermosetting resin and a photosensitive resin, and a precursor thereof contains a monomer or an oligomer, which is cured by radiation exposure to produce a transparent resin. These transparent resin can be used alone, or two or more can be mixed for use.

Examples of the thermoplastic resin include butyral resin, a styrene-maleic acid copolymer, chlorinated polyethylene, chlorinated polypropylene, polyvinyl chloride, a vinyl chloride-vinyl acetate copolymer, polyvinyl acetate, polyurethane resin, polyester resin, acrylic resin, alkyd resin, polystyrene, polyamide resin, gum resin, cyclized rubber resin, celluloses, polyethylene, polybutadiene and polyimide resin.

Examples of the thermosetting resin include epoxy resin, benzoguanamine resin, rosin modified maleic resin, rosin modified fumaric resin, melamine resin, urea resin and phenolic resin.

Examples of the photosensitive resin include resins where an optical cross linking group, such as a (meth)acryloyl group or styryl group, are introduced in a linear polymer. As resins, resins where a linear polymer having a reactive substituent group, such as a hydroxide group, a carboxyl group or an amino group, and a (meth)acryl compound or cinnamic acid having a reactive substituent group, such as an isocyanate group, an aldehyde group or an epoxy group, react with each other can be cited.

In addition, as the photosensitive resin, a linear polymer which includes an acid anhydride, such as a styrene-maleate anhydride copolymer or an α-olefin-maleate anhydride copolymer, which is converted to a half ester using a (meth) acryl compound having a hydroxide group, such as hydroxyalkyl (meth)acrylate, can be used.

Examples of the monomer and the oligomer contained in the precursor include (meth)acrylic ester such as methyl (meth)acrylate, ethyl (meth)acrylate, 2-hydroxyethyl (meth) acrylate, 2-hydroxypropyl (meth)acrylate, cyclohexyl (meth) acrylate, β-carboxyethyl (meth)acrylate, polyethylene glycol di(meth)acrylate, 1,6-hexanediol di(meth)acrylate, triethylene glycol di(meth)acrylate, tripropylene glycol di(meth) acrylate, trimethylolpropane tri(meth)acrylate, pentaerythritol tri(meth)acrylate, 1,6-hexanediol diglycidyl ether di(meth)acrylate, bisphenol A diglycidyl ether di(meth)acrylate, neopentyl glycol diglycidyl ether di(meth)acrylate, dipentaerythritol hexa(meth)acrylate, tricyclodecanyl (meth)acrylate, ester acrylate, (meth)acrylic ester of methylolated melamine, epoxy (meth)acrylate and urethane acrylate; (meth)acrylic acid; styrene; vinyl acetate; ether such as hydroxyethyl vinyl ether, ethylene glycol divinyl ether, pentaerythritol trivinyl ether; (meth)acrylamide, N-hydroxymethyl (meth)acrylamide, N-vinyl formamide, and acrylonitrile. These monomers and oligomers contained in a precursor can be used singly of one kind or by mixture of two kinds or more.

Organic or inorganic pigments can be used singly of one kind or by mixture of two kinds or more as a coloring matter contained in the coloring composition.

A pigment high in chromogenic properties and heat resistance, particularly, a pigment high in resistance to thermal decomposition is preferable among pigments; an organic pigment is ordinarily used.

Specific examples of the organic pigment usable for the coloring composition of the present invention are hereinafter shown by color index numbers.

Examples of a red photosensitive coloring composition for forming a red region to be used include red pigments such as C. I. Pigment Red 1, 2, 3, 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272 and 279.

The red photosensitive coloring composition can be used together with a yellow pigment and an orange pigment.

Examples of a green photosensitive coloring composition for forming a green region to be used include green pigments such as C. I. Pigment Green 7, 10, 36 and 37.

The green photosensitive coloring composition can be used together with a yellow pigment.

Examples of a blue photosensitive coloring composition for forming a blue region to be used include blue pigments such as C. I. Pigment Blue 15, 15:1, 15:2, 15:3, 15:4, 15:6, 16, 22, 60, 64 and 80.

The blue photosensitive coloring composition can be used together with violet pigments such as C. I. Pigment Violet 1, 19, 23, 27, 29, 30, 32, 37, 40, 42 and 50.

Examples of a black photosensitive coloring composition for forming a black matrix to be used include carbon black, aniline black, anthraquinone black pigment and perylene black pigment; specifically, C. I. Pigment Black 1, 6, 7, 12, 20 and 31.

A mixture of a red pigment, a blue pigment and a green pigment can be used for the black photosensitive coloring composition.

With regard to a black pigment, carbon black is preferable in view of price and light shielding properties, and may be surface-treated with a resin and the like.

In order to adjust color tone, the black photosensitive coloring composition can be used together with a blue pigment and a violet pigment.

Carbon black preferably has a specific surface area of 50 to 200 $m^2/g$ by a BET method from the viewpoint of the black matrix shape. The reason thereof is that deterioration in the black matrix shape is caused in the case of using carbon black having a specific surface area of less than 50 $m^2/g$, while a dispersing aid is excessively adsorbed in carbon black to cause the necessity of blending a large amount of a dispersing aid for developing physical properties in the case of using carbon black having a specific surface area of more than 200 $m^2/g$.

Carbon black preferably has the oil absorption amount of dibutyl phthalate (hereinafter referred to as 'DBP') of 120 cc/100 g or less in view of sensitivity; lower oil absorption amount thereof is more preferable.

In addition, the average primary particle diameter of carbon black is preferably 20 to 50 nm. Carbon black having an average primary particle diameter of less than 20 nm causes dispersion at high concentration to be difficult, so that a photosensitive black composition having favorable temporal stability is hardly obtained. On the other hand, the use of carbon black having an average primary particle diameter of more than 50 nm occasionally brings deterioration in the black matrix shape.

Examples of the inorganic pigment include metallic oxide powders such as colcothar (ferric oxide red), cadmium red, ultramarine blue, prussian blue, chrome oxide green, cobalt green, umber, titanium black and synthetic iron black, metallic sulfide powders, and metal powders.

The Inorganic pigment is used in combination with an organic pigment for securing favorable application properties, sensitivity and developability while balancing chroma and brightness. The coloring composition of the present invention can contain dyestuffs for toning within a range of not deteriorating heat resistance.

Each coloring composition may include a solvent. This is in order to disperse the coloring matter sufficiently in the coloring matter carrier and apply the coloring composition onto the transparent substrate so that it has a predetermined thickness when dry. When a coloring composition containing a solvent is used, the respective color regions having a predetermined thickness and the black matrix can be easily formed.

Examples of the solvent include cyclohexanone, ethyl cellosolve acetate, butyl cellosolve acetate, 1-methoxy-2-propyl acetate, diethylene glycol dimethyl ether, ethyl benzene, ethylene glycol diethyl ether, xylene, ethyl cellosolve, methyl-n-amyl ketone, propylene glycol monomethyl ether toluene, methyl ethyl ketone, ethyl acetate, methanol, ethanol, isopropyl alcohol, butanol, isobutyl ketone and a petroleum solvent. These solvents can be used singly of one kind or by mixture of two kinds or more.

As described above, a coloring composition where a coloring matter or two or more coloring matters are microscopically dispersed in the coloring matter carrier and the solvent, preferably together with a photopolymerization initiator, can be used. The components forming the above described coloring composition can be microscopically dispersed through various types of dispersing means, such as three-roll mill, two-roll mill, sand mill, kneader or attriter.

Also, a photosensitive coloring composition containing two kinds or more of coloring matters can be produced in such a manner that each coloring matter is separately dispersed minutely in a coloring matter carrier and a solvent to mix the dispersion.

Dispersing aids such as a resin pigment dispersing agent, a surface-active agent and a coloring matter derivative can properly be contained on the occasion of dispersing a coloring matter in a coloring matter carrier and a solvent.

The dispersing aids are so excellent in dispersion of a pigment as to offer a great effect of preventing the pigment from reagglomerating after dispersion. Thus, a photosensitive coloring composition comprising a pigment dispersed in a coloring matter carrier and a solvent by using dispersing aids allows a color filter excellent in transparency to be formed.

The resin pigment dispersing agent has a pigment affinity site having a property of being adsorbed in a pigment, and a site compatible with a coloring matter carrier. The resin pigment dispersing agent is adsorbed in a pigment to offer the function of stabilizing dispersion of the pigment in a coloring matter carrier.

Examples of the resin pigment dispersing agent include polycarboxylate esters such as polyurethane and polyacrylate, unsaturated polyamide, polycarboxylic acid, polycarboxylic acid (partial) amine salt, polycarboxylic acid ammonium salt, polycarboxylic acid alkylamine salt, polysiloxane, long-chain polyaminoamide phosphate, hydroxyl group-containing polycarboxylate ester and modified products thereof, oily dispersing agents such as amide and salts thereof, formed by reaction of poly(lower alkyleneimine) and polyester having a free carboxyl group, a (meth)acrylic acid-styrene copolymer, a (meth)acrylic acid-(meth)acrylate copolymer, a styrene-maleic acid copolymer; water-soluble resins and water-soluble polymeric compounds such as polyvinyl alcohol and polyvinyl pyrrolidone; polyesters; modified polyacrylates, an ethylene oxide/propylene oxide addition compound; and ester phosphates. These resin pigment dispersing agents can be used singly of one kind or by mixture of two kinds or more.

Examples of the surface-active agent include anionic surface-active agents such as sodium lauryl sulfate, polyoxyethylene alkyl ether sulfate, sodium dodecylbenzene sulfonate, an alkaline salt of a styrene-acrylic acid copolymer, sodium stearate, sodium alkylnaphthalene sulfonate, sodium alkyl diphenyl ether disulfonate, monoethanolamine lauryl sulfate, triethanolamine lauryl sulfate, ammonium lauryl sulfate, monoethanolamine stearate, monoethanolamine of a styrene-acrylic acid copolymer and polyoxyethylene alkyl ether phosphate; nonionic surface-active agents such as polyoxyethylene oleyl ether, polyoxyethylene lauryl ether, polyoxyethylene nonylphenyl ether, polyoxyethylene alkyl ether phosphate, polyoxyethylene sorbitan monostearate and polyethylene glycol monolaurate; cationic surface-active agents such as quaternary alkyl ammonium salt and ethylene oxide adduct thereof; and amphoteric surface-active agents such as alkyl betaine, for example, betaine alkyl dimethyl aminoacetate and alkyl imidazoline. These surface-active agents can be used singly of one kind or by mixture of two kinds or more.

The coloring matter derivative is a compound in which a substituent is introduced into an organic coloring matter, and the organic coloring matter contains an aromatic polycyclic compound in pale yellow such as naphthalene and anthraquinone, which are not generally called coloring matters.

Examples of the coloring matter derivative to be used include those described in Japanese Unexamined Patent Publication No. 63-305173, Japanese Examined Patent Publication Nos. 57-15620, 59-40172, 63-17102 and 5-9469. These coloring matter derivatives can be used singly of one kind or by mixture of two kinds or more.

Examples of the photopolymerization initiator to be used include acetophenone compounds such as 4-phenoxydichloroacetophenone, 4-tert-butyl-dichloroacetophenone, diethoxyacetophenone, 1-(4-isopropylphenyl)-2-hydroxy-2-methylpropane-1-one, 1-hydroxycyclohexylphenyl ketone and 2-benzyl-2-dimethylamino-1-(4-morpholinophenyl)-butane-1-one, benzoin compounds such as benzoin, benzoin methyl ether, benzoin ethyl ether, benzoin isopropyl ether and benzyldimethyl ketal, benzophenone compounds such as benzophenone, benzoylbenzoic acid, methyl benzoylbenzoate, 4-phenylbenzophenone, hydroxybenzophenone, acrylated benzophenone, 4-benzoyl-4'-methyldiphenyl sulfide and 3,3',4,4'-tetra(tert-butylperoxycarbonyl)benzophenone, thioxanthone compounds such as thioxanthone, 2-chlorthioxanthone, 2-methylthioxanthone, isopropylthioxanthone, 2,4-diisopropylthioxanthone and 2,4-diethylthioxanthone, triazine compounds such as 2,4,6-trichloro-s-triazine, 2-phenyl-4,6-bis(trichloromethyl)-s-triazine, 2-(para-methoxyphenyl)-4,6-bis(trichloromethyl)-s-triazine, 2-(para-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine and 2,4-trichloromethyl(4'-methoxystyryl)-6-triazine, oxime ester compounds such as 1,2-octanedione, 1-[4-(phenylthio)-, 2-(O-benzoyloxime)] and O-(acetyl)-N-(1-phenyl-2-oxo-2-(4'-methoxy-naphtyl)ethylidene)hydroxylamine, phosphine compounds such as bis(2,4,6-trimethylbenzoyl)phenylphosphine oxide and 2,4,6-trimethylbenzoyldiphenylphosphine oxide, quinone compounds such as 9,10-phenanthrene quinone, camphorquinone and ethyl anthraquinone, borate compounds, carbazole compounds, imidazole compounds, and titanocene compounds. These photopolymerization initiators can be used singly of one kind or by mixture of two kinds or more.

The used amount of the photopolymerization initiator is preferably 0.5 to 45% by mass, more preferably 3 to 30% by mass and further preferably 4 to 10% by mass on the basis of the total solid content of the photosensitive coloring composition.

In addition, a sensitizer including amine compounds such as triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N,N-dimethylpara-toluidine, 4,4'-bis(dimethylamino)benzophenone, 4,4'-bis(diethylamino)benzophenone and 4,4'-bis(ethylmethylamino)benzophenone may be used together. These sensitizers can be used singly of one kind or by mixture of two kinds or more.

Among the above-mentioned sensitizers, 4,4'-bis(dimethylamino)benzophenone and 4,4'-bis(diethylamino)benzophenone are preferable, and 4,4'-bis(diethylamino)benzophenone is more preferable.

The used amount of the sensitizer is preferably 0.5 to 55% by mass, more preferably 2.5 to 40% by mass and further preferably 3.5 to 25% by mass on the basis of the total amount of the photopolymerization initiator and the sensitizer.

Furthermore, the photosensitive coloring composition may include a compound that works as a chain transfer agent. As an example of the compound, multifunctional thiol can be cited.

The multifunctional thiol may be a compound having two or more thiol groups. Examples of the multifunctional thiol include hexanedithiol, decanedithiol, 1,4-butanediolbisthiopropionate, 1,4-butanediolbisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine and 2-(N,N-dibutylamino)-4,6-dimercapto-s-triazine. These multifunctional thiols can be used singly of one kind or by mixture of two kinds or more.

The used amount of the multifunctional thiol is preferably 0.1 to 30% by mass, more preferably 1 to 20% by mass on the basis of the total solid content of the photosensitive coloring composition.

The photosensitive coloring composition can be prepared in the form of a coloring resist material of solvent development type or alkaline development type. The coloring resist material is a material in which a coloring matter is dispersed in a coloring composition containing a thermoplastic resin, a thermosetting resin or a photosensitive resin, a monomer, a photopolymerization initiator, and a solvent. The coloring matter is preferably contained at a ratio of 5 to 70% by mass, more preferably 20 to 50% by mass on the basis of the total solid content of the photosensitive coloring composition, and the residual amount thereof is substantially composed of a resinous binder offered by a coloring matter carrier.

It is preferable for large, coarse particles of 5 μm or larger to be removed from the photosensitive coloring composition by means of a centrifugal separator, a sintering filter or a membrane filter, it is more preferable for large, coarse particles of 1 μm or larger to be removed, and it is most preferable for large, coarse particles of 0.5 μm or larger and mixed-in dust to be removed.

With regard to the formation of each color region and the black matrix, a photosensitive coloring composition prepared as a coloring resist material of solvent development type or alkaline development type is applied on a transparent substrate so as to be a predetermined dried film thickness. Examples of this application method to be used include spray coating, spin coating, slit coating and roll coating. The film, dried as required, is subjected to ultraviolet exposure through a mask having a predetermined pattern provided in contact or non-contact with this film. Thereafter, the film is immersed in a solvent or an alkaline developing solution, or is sprayed with the developing solution by a spray to remove uncured portions and then formed into a desirable pattern. In addition, in order to promote polymerization of the coloring resist material, heating can be performed as required. A black matrix and each color region are sequentially formed on a transparent substrate, so that a color filter can be formed thereon. Such a photolithographic method allows each color region and a black matrix to be formed with higher accuracy than a printing method.

On the occasion of development, an aqueous solution of sodium carbonate, sodium hydroxide and the like is used as the alkaline developing solution. An organic alkali such as dimethylbenzylamine and triethanolamine can also be used as the alkaline developing solution. An antifoaming agent and a surface-active agent can also be added to the developing solution.

A shower development method, a spray development method, a dip (immersion) development method and a puddle (liquid heap) development method can be applied as development processing methods.

In order to improve ultraviolet exposure sensitivity, after the above-mentioned coloring resist material is applied and dried, a water-soluble or alkali-soluble resin (such as polyvinyl alcohol and water-soluble acrylic resin) can also be applied and dried to form a film for preventing inhibition of polymerization due to oxygen and thereafter perform ultraviolet exposure.

<Control of Rth in Each Color Region in Color Filter>

When the color filter according to the present invention is manufactured, the blue region, the green region and the red region are formed so that Rth(B), Rth(G) and Rth(R) satisfy the above formula (2) or formula (3). In the following, a technique for controlling Rth(B), Rth(G) and Rth(R) in the respective color regions is described.

As an example of the above described technique, a method for changing the Rth of the transparent resin of the coloring matter carrier in the red region, the green or the blue region can be cited. Specifically, as a transparent resin of a coloring matter carrier used in at least one color region, a transparent resin having a different Rth from the transparent resin of the coloring matter carrier in other color regions is used. Preferably, transparent resins having different Rth are used as the transparent resins for the coloring matter carriers respectively used in the red region, the green region and the blue region.

The Rth of the transparent resin of the coloring matter carrier can be controlled in accordance with any method, for example a) a method for controlling the viscosity of the resin when it dissolves, b) a method for controlling the Δn of the resin, and c) a method for controlling the thickness of the resin.

In a) a method for controlling the viscosity of the resin when it dissolves, two types of transparent resins having a different molecular weight distribution can be used, for example, one of the transparent resins having a different molecular weight distribution becomes a transparent resin having a large Rth, and the other becomes a transparent resin having a small Rth.

The molecules within resins having a greater molecular weight easily entangle, and therefore, the resin having a greater molecular weight has a higher viscosity when the resin is dissolved in a solvent to the same concentration. Accordingly, the molecules in the resin having a greater molecular weight are secured at an earlier stage in the drying process after application. Therefore, when there is retardation in the thickness direction in the subsequent drying process, the resin having a greater molecular weight has a greater Rth than when a resin having a smaller molecular weight is used. The resin is cross-linked using an electron beam or heat, or in accordance with another method in this state, and thus, a cured substance where the Rth is controlled can be obtained. In the case where a color filter that satisfies the formula (2) is formed, for example, a transparent resin having a greater molecular weight than the coloring matter carrier in the green region and in the red region may be used as the coloring matter carrier for the coloring composition that forms the blue region, and in addition, a transparent resin having a greater molecular weight than the coloring matter carrier in the red region can be used as the coloring matter carrier for the coloring composition that forms the green region.

Next, in another embodiment for the a) method for controlling the viscosity of the resin when it dissolves, two types of transparent resins having different intermolecular interaction are used. One of the transparent resins having different intermolecular interaction is a transparent resin having a larger Rth, and the other is a transparent resin having a smaller Rth. When a resin having a functional group as a branched chain and a resin having no functional group are compared, for example, the resin having a functional group has more intermolecular interaction, and accordingly, a higher viscosity. Therefore, for the same reasons as described above, the resin having a functional group has a greater Rth, respectively.

In addition, Rth can be controlled in accordance with a method for substituting part of the resin: a hydrogen group or a hydrocarbon group, with a fluorine group, for example. Taking a case where polyimide (transparent resin) is used as the coloring matter carrier as an example, the fluorine containing cross-linking polyimides disclosed in Japanese Patent No. 3211108, Japanese Examined Patent Publication No. H2 (1990)-14365, Japanese Examined Patent Publication No. H2 (1990)-14366, Japanese Patent No. 2785359, Japanese Translation of International Unexamined Patent Publication No. 2003-520878 and the like are appropriate for use. These gazettes disclose polyamides having similar structures and various polyimides where hydrogen or a hydrocarbon group is substituted with fluorine. The fluorine substituted polyimide has a small Rth when part of the polyimide, hydrogen or a hydrocarbon group is substituted with a fluorine group in this manner.

In addition, it is possible to control Rth to a certain extent in accordance with a method in which the type and concentration of the solvent are changed when a mixture of the coloring matter carrier and the pigment is applied. In the case where the viscosity of the solvent is relatively small when cured, a color filter (each color region) having a small Rth can be formed.

Next, in the b) method for controlling the Δn of the resin, first, transparent resins of different types can be used, for example. The epoxy resins, for example, have a small Rth in comparison with general polyimide resins. Different transparent resins are used as transparent resins for the coloring matter carrier of the coloring composition in each color region, and thus, the Rth can be controlled in each color region.

In addition, in the case where the main chain skeleton is fixed (in the case where the main chain is the same resin), a branched chain can be substituted with an element having strong electrophilic properties so that the Rth of the resin lowers. Meanwhile, the number of conjugated electrons in the main chain skeleton are increased (for example, by introducing an aromatic ring), and thus, the Rth of the resin can be increased.

In accordance with the c) method for controlling the thickness of the resin, the film thickness in each color region is simply changed, and thus, the Rth is controlled to a desired retardation value in each color region. When the film thickness in a certain color region is increased, for example, the Rth in this color region can be increased.

<Optical Compensation Layer>

According to the present invention, an appropriate optical compensation layer in which the Rth is the polar opposite of the liquid crystal cell, so that the wavelength dispersion of the Rth in the VA type liquid crystal cell can be cancelled, and exhibits such a wavelength dispersion that the absolute value of Rth in each wavelength of the optical compensation layer is approximately equal to the Rth for each wavelength of the crystal liquid cell can be selected for use.

As for the above described optical compensation layer used in a VA type liquid crystal cell, an optical compensation layer (so-called negative C plate) having a relationship of nx≈ny>nz and an optical compensation layer where the refractive index is controlled in the thickness direction having a relationship of nx>nz>ny can be cited as examples. Here, nx and ny indicate the in-plane refractive index (nx>ny): nx is the refractive index in the direction of the slow axis, ny is the refractive index in the direction of the fast axis, and nz indicates the refractive index in the thickness direction.

The retardation in the VA type liquid crystal cell is preferably compensated for with an optical compensation layer having a relationship of nx≈ny>nz. An optical compensation layer where the refractive index is controlled in the thickness direction having a relationship of nx>nz>ny has an effect of preventing the screen from being colored blue or the like by shifting of the axis of the polarizer from the crossed nicols when viewed from a diagonal angle. It is preferable for the optical compensation layer having nx≈ny>nz as described above to be placed adjacent to the liquid crystal cell. According to the present invention, one or two different layers can be layered for the optical compensation layer.

As the material for forming the above described negative C plate, the non-liquid crystal polymer described in paragraphs (0022) to (0076) in Japanese Unexamined Patent Publication No. 2005-148545 can be cited. Specifically, polyamide, polyimide, polyester, polyether ketone, polyamide imide, polyester imide and the like can be cited as the material for forming the negative C plate. In a manufacturing method for the above described negative C plate, an application liquid containing the above described material is applied on a transparent substrate and cured so that a so-called negative C plate having a relationship of nx≈ny>nz is obtained. However, the material for forming the negative C plate is not limited to these materials.

As the above described transparent substrates, polymer films of a polyolefin, such as polyethylene or polypropylene, polyimide, polyamide imide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyacrylate, acryl resins, polyvinyl alcohol, polypropylene, cellulose based polymers, epoxy resins, phenol resins and mixtures of norbornene based resins, isobutene/N-methyl maleimide copolymers and styrene/acryl nitrile copolymers can be cited. Among these, it is particularly preferable to use a polymer film which includes polyethylene, polypropylene, polyethylene terephthalate, polyethylene naphthalate, cellulose based polymers, norbornene based resins or mixtures of isobutene/N-methyl maleimide copolymers and styrene/acryl nitrile copolymers for the transparent substrates. In addition, a film where a hydrophilic process, a hydrophobic process or a process for reducing the solubility of the substrate is carried out on the surface of the polymer films can be used as the transparent substrate.

As examples of the solvent used for the application liquid when the above described negative C plate is formed, hydrocarbon halides such as chloroform, dichloromethane, carbon tetrachloride, dichloroethane, tetrachloroethane, trichloroethylene, tetrachloroethylene, chlorobenzene or orthodichlorobenzene, phenol such as phenol or parachlorophenol, aromatic hydrocarbons such as benzene, toluene, xylene, methoxybenzene or 1,2-dimethoxybenzene, acetone, ethyl acetate, t-butyl alcohol, glycerin, ethylene glycol, triethylene glycol, ethylene glycol monomethyl ether, diethylene glycol dimethyl ether, propylene glycol, dipropylene glycol, 2-methyl-2,4-pentanediol, ethyl cellosolve, butyl cellosolve, 2-pyrolidone, N-methyl-2-pyrolidone, pyridine, triethylamine, dimethyl formamide, dimethylacetoamide, acetonitrile, butylonitrile, methyl isobutyl ketone, methyl ether ketone, cyclopentane and carbon disulfide can be cited. These solvents can be used alone, or two or more can be mixed for use.

Though an appropriate concentration for the solution in the above described application liquid can be determined, it is usually 0.5 mass % or higher and 50 mass % or lower, preferably 1 mass % or higher and 40 mass % or lower, more preferably 2 mass % or higher and 30 mass % or lower, taking the applicability on the base layer to consideration (prevention of mixing in of foreign substances, inconsistency and stripes at the time of application). In the case where the concentration of the solution is 0.5 mass % or lower, the viscosity of the solution is too low, and therefore, it becomes difficult to apply the solution to a predetermined thickness at one time. Meanwhile, in the case where the concentration of the solution is 30 mass % or higher, the viscosity of the solution is too high, and in some cases a problem arises, such that the application surface becomes coarse.

As a method for forming an optical compensation layer where the refractive index is controlled in the thickness direction having a relationship of nx>nz>ny, the method described in Japanese Patent No. 2818983 can be cited. Specifically, the method for forming an optical compensation layer is a method for forming a multilayer body by pasting contracting films on one or both surfaces of a resin film and stretching it while heat is applied.

As the above described resin film, a film having positive or negative birefringence can be cited. As examples of the above described film having positive birefringence, films which include polycarbonate, polyvinyl alcohol, cellulose acetate, polyester, polyacrylate, polyimide or polyolefin can be cited. As examples of the above described film having a negative birefringence, films which include polystyrene and styrene based copolymers, as well as polymethyl methacrylate and methyl methacrylate copolymers, can be cited.

What is claimed is:

1. A liquid crystal cell substrate with a color filter having a transparent substrate and a color filter having three color regions: blue, green and red, where a retardation value Rth in the thickness direction, which is represented by the following formula (1) in the blue region, the green region and the red region of the color filter, satisfies the following formula (2) or (3):

$$Rth=[\{(nx+ny)/2\}-nz] \times d \quad \text{Formula (1)}$$

$$Rth(B)>Rth(G)>Rth(R) \quad \text{Formula (2)}$$

$$Rth(B)<Rth(G)<Rth(R) \quad \text{Formula (3)}$$

wherein nx and ny represent the in-plane refractive index of each color region (provided that nx $\geq$ ny), nz represents the refractive index in the thickness direction of each color region, and d represents the thickness of each color region, Rth(B) represents the retardation value in the thickness direction for a wavelength of 450 nm in the blue region, Rth(G) represents the retardation value in the thickness direction for a wavelength of 546 nm in the green region, and Rth(R) represents the retardation value in the thickness direction for a wavelength of 633 nm in the red region.

2. The liquid crystal cell substrate with a color filter according to claim 1, wherein the following formula (4) is satisfied:

$$|Rth(B)-Rth(G)| \geq |Rth(G)-Rth(R)| \quad \text{Formula (4).}$$

3. A liquid crystal cell having the liquid crystal cell substrate with a color filter according to claim 1 and an optical compensation layer.

4. The liquid crystal cell according to claim 3, wherein the optical compensation layer is either a compensation layer having nx$\approx$ny>nz or a compensation layer having nx>nz>ny, wherein nx represents the in-plane refractive index in the direction of the slow axis, ny represents the in-plane refractive index in the direction of the fast axis, and nz represents the refractive index in the thickness direction.

5. The liquid crystal cell according to claim 3, which is of a VA (vertical alignment) type.

6. A liquid crystal display having the liquid crystal cell according to claim 1.

* * * * *